United States Patent
Parnaby

(10) Patent No.: US 7,400,230 B2
(45) Date of Patent: Jul. 15, 2008

(54) VEHICLE SECURITY DEVICE

(75) Inventor: Michael Boyden Parnaby, Morningside (ZA)

(73) Assignee: PFK Electronics (PTY) Ltd., Durban (ZA)

( * ) Notice: Subject to any disclaimer, the term of this patent is extended or adjusted under 35 U.S.C. 154(b) by 341 days.

(21) Appl. No.: 11/124,115

(22) Filed: May 9, 2005

(65) Prior Publication Data

US 2005/0253691 A1 Nov. 17, 2005

(30) Foreign Application Priority Data

May 11, 2004 (ZA) ................... 2004/3588

(51) Int. Cl.
*B60R 25/10* (2006.01)
(52) U.S. Cl. ................. 340/426.1; 340/426.34
(58) Field of Classification Search ............. 340/426.1, 340/426.11, 426.34
See application file for complete search history.

(56) References Cited

U.S. PATENT DOCUMENTS

| | | | | |
|---|---|---|---|---|
| 5,572,186 A * | 11/1996 | Traxler et al. | ......... | 340/426.34 |
| 6,483,428 B1 * | 11/2002 | Fish et al. | ................ | 340/425.5 |
| 6,515,582 B1 * | 2/2003 | Teowee et al. | ........... | 340/426.1 |
| 6,741,166 B1 * | 5/2004 | Sanchez | ................ | 340/426.34 |
| 6,885,290 B2 * | 4/2005 | Tsuji | .......................... | 340/427 |
| 7,104,851 B1 * | 9/2006 | Gonring et al. | .......... | 340/426.1 |
| 7,106,171 B1 * | 9/2006 | Burgess | ................... | 340/426.1 |
| 7,138,907 B2 * | 11/2006 | Young et al. | ............. | 340/426.1 |

* cited by examiner

*Primary Examiner*—John Tweel, Jr.
(74) *Attorney, Agent, or Firm*—Millen, White, Zelano & Branigan, P.C.

(57) ABSTRACT

This invention relates to a vehicle security device. It relates, more particularly, to a security device or system which operatively serves as an alarm and/or immobilizer. The invention provides a vehicle security system including first and second parts, each including an electronic sub-circuit and a housing, and a communications link. In the operative configuration of the system on a vehicle, the first part is permanently mounted on the vehicle and the second part temporarily. The sub-circuits are interconnected via the link to define an integral control circuit, thus rendering the system operative. Should the vehicle be sold and the purchaser not require the system, the second part and the link may be removed and re-used by the seller. The value of only the first part is sacrificed by the seller. The system is aimed primarily at vehicle dealers.

24 Claims, 1 Drawing Sheet

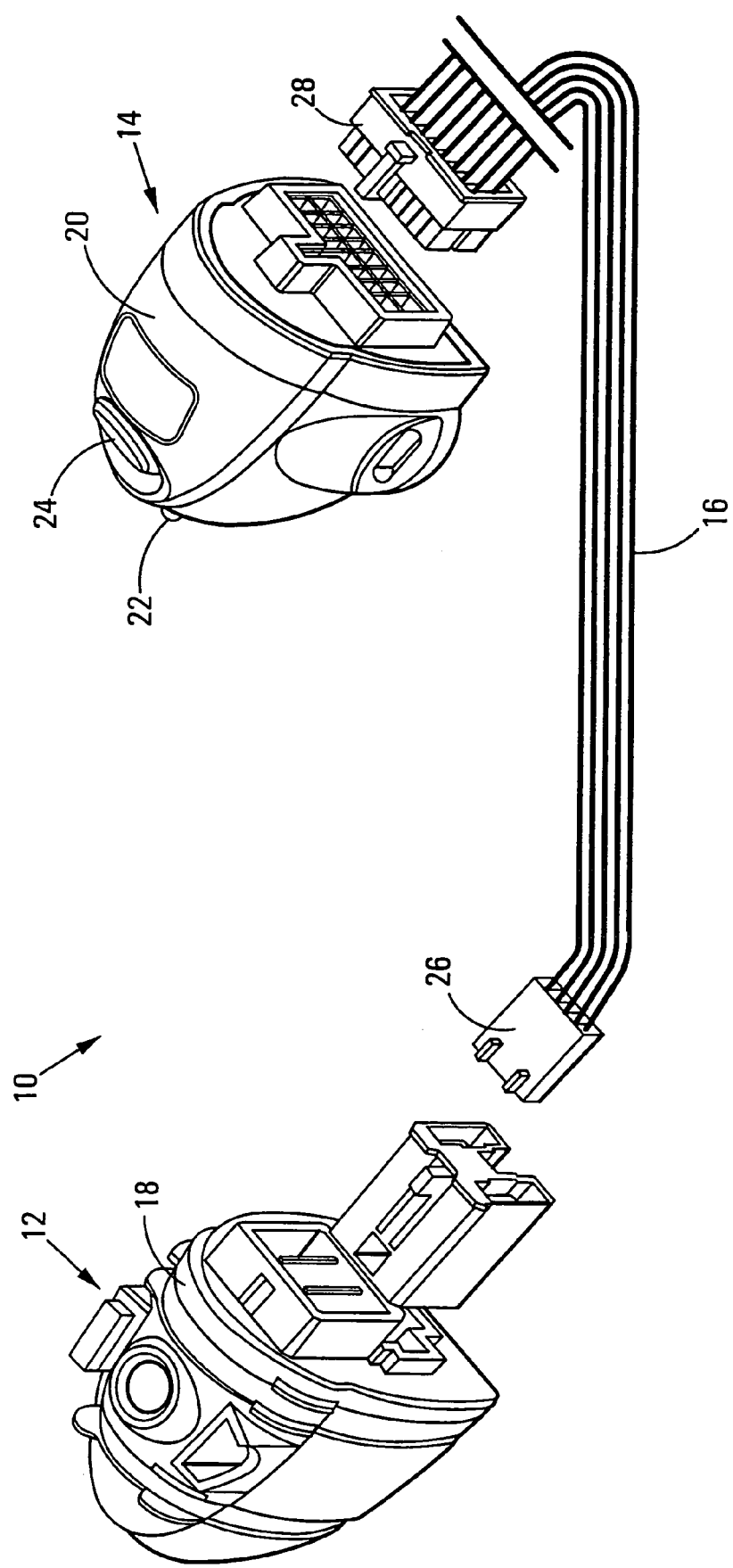

VEHICLE SECURITY DEVICE

THIS INVENTION relates to a vehicle security device. It relates, more particularly, to a security device or system which operatively serves as an alarm and/or an immobilizer.

It is known, particularly where vehicles do not have a vehicle security device as standard equipment, for vehicle dealerships to install a vehicle security device in each such vehicle in its forecourt, which is on display for sale. This is commonly referred to as "preloading" of a vehicle with a vehicle security device and vehicles are thereby effectively "protected", while on display in the forecourts of the dealers. Upon concluding the sale of a vehicle, the salesman involved will attempt to sell the vehicle security device as well in order to recover the cost of the installed product, the cost of installation and to make a profit. If the purchaser does not want to buy the vehicle security device with the vehicle, the device is either removed or disabled.

The main advantages of preloading are that vehicles are protected while on the forecourt and an opportunity to earn additional revenue also is created.

The main disadvantages of preloading are that if the purchaser of a vehicle does not want to buy the preloaded vehicle security device, the device must be removed or disabled, which is expensive, and if disabled, the cost of the device is forfeited. Particularly, the "main part" of a vehicle security device generally includes a housing and a control circuit having functionality associated with vehicle security housed within the housing. The main part, in practice, will be mounted in a relatively inaccessible location in order to inhibit tampering with the components of the device that can render it ineffective. This main part often is mounted behind the dash board of a vehicle. If preloaded and not purchased, removal of the device can be carried out only by a suitably qualified person, in order to ensure that the normal operation of the vehicle is not affected, which has a significant cost factor linked therewith. Such a qualified person also may be required for disabling the device if it is not to be removed, and this will result also in the cost of the entire device being forfeited.

It is thus an object of this invention to provide a vehicle security device or system that is suitable for "preloading", as envisaged, but in respect of which the disadvantages referred to above are at least ameliorated.

According to the invention there is provided a vehicle security system including
- a first part, including a housing and a first electronic sub-circuit housed in the housing, which can be installed in a vehicle in a location which is not readily accessible;
- a second part, including a housing and a second electronic sub-circuit housed in the housing, which can be installed in a vehicle in a readily accessible location; and
- a communications link via which the first and the second sub-circuits are, in the operative configuration of the system, releasably interconnected to define an integral control circuit having functionality associated with vehicle security.

It will thus be understood that the first part and the second part of the vehicle security system of the invention, through their connection via the electronic communications link, will effectively provide the functionality of the main part of a conventional vehicle security device, as referred to above, and will thus render the vehicle security system of the invention similarly operable and effective.

In practice, with the first part mounted in a relatively inaccessible location on a vehicle, for example behind the dash board of the vehicle, tampering with the security components of the security system is effectively inhibited. With the second part of the security system linked with its first part via the electronic communications link and being mounted in a relatively accessible location in the vehicle, e.g. on the dash board of the vehicle in an accessible location, insofar as the second part will account for the major part of the component cost of the vehicle security system and particularly the more expensive components, if the vehicle security system is preloaded on a vehicle and a purchaser of the vehicle does not wish to purchase the system, the second part can be easily removed from the vehicle without requiring significant skills and the most expensive part of the security system is thus easily recoverable, while the first part can be simply left within the vehicle. The Applicant envisages that the second part of the system may account for up to approximately 60% of the value of the entire system. In this case, if removal of a preloaded system is required, only approximately 40% of the value of the system will remain on the vehicle, while the remainder is removed and rendered reusable.

The vehicle security system may be configured to provide for the operation of a vehicle in which the system is operatively installed to be restored to its pre-installation state by merely removing the second part whilst the system is disarmed, leaving the first part in place. Alternatively, it may be configured to provide for the operation of such a vehicle to be so restored by merely removing both the second part and the communications link whilst the system is disarmed, leaving the first part in place.

The vehicle security system may be configured so that tampering with the second part whilst the system is armed will trigger the system to activate associated alarm means.

The first electronic sub-circuit and the communications link of the vehicle security system may define complementary plug-in connectors via which they are operatively releasably interconnected. Alternatively or additionally, the second electronic sub-circuit and the communications link may define complementary plug-in connectors via which they are operatively releasably interconnected.

The second electronic sub-circuit of the vehicle security system may include a central microprocessor for controlling the operation of the control circuit, in the operative configuration of the security system. The microprocessor may be programmable. The first electronic sub-circuit may include an ancillary microprocessor, the processors of the first and second electronic sub-circuits providing for coded communication between them.

The second electronic sub-circuit of the vehicle security system may include at least one of the following:
- a receiver, for receiving arm/disarm signals from a compatible transmitter;
- a power supply for the entire control circuit;
- protection circuitry for protecting the control circuit from interference from a vehicle on which it is operatively installed;
- an intrusion sensor;
- a light emitting status indicator light for indicating an armed status of the system;
- a relay switch for flashing the indicators of a vehicle on which the system is operatively installed; and
- a reset button.

The first electronic sub-circuit of the vehicle security system may include a relay operatively associated with immobilization of a vehicle, in the operative configuration of the security system.

The housing of the first part of the vehicle security system may include a mounting formation providing for it to be securely mounted on a vehicle.

The first electronic sub-circuit of the vehicle security system may include a shock sensor. In order to render such a sensor effective, it may require secure mounting on a vehicle and, as such, it is preferred for it to be a component of the first electronic sub-circuit and, accordingly, the first part.

The housing of the second part of the vehicle security system may include a mounting formation providing for it to be removably mounted inside the passenger compartment of a vehicle. It will be understood that with the second part so mounted, if removal is required, no visible damage to the dash board of the vehicle will have occurred. Particularly, the housing of the second part may permit initial attachment to the dash board of a vehicle by double sided adhesive tape, or the like, and, if required, more permanent attachment with the aid of securing screws or the like, which will be required if the purchaser of a vehicle, having the vehicle security system preloaded therein, decides to purchase the system also.

The exact configuration of the two parts of the vehicle security system of the invention, as well as the relationship between them in terms of components carried by the respective parts, clearly are greatly variable. The invention thus extends also to such variations of vehicle security systems which still incorporate the essential principles of the present invention, which provide for the components of the system to be carried in two separate housings forming separate parts, that are electronically linked by a suitable electronic communications link.

Further features of the vehicle security system of the invention are described hereafter with reference to an example of such a system, which is illustrated in the accompanying diagrammatic drawing. The drawing particularly shows, in three-dimensions, the external configuration of a vehicle security system, in accordance with the invention.

Referring to the drawing, a vehicle security system, in accordance with the invention, is designated generally by the reference numeral 10. The vehicle security system 10 includes generally a first part 12, a second part 14, and an electronic communications link 16.

The vehicle security system 10 is particularly suitable for "pre-loading" applications as herein envisaged, the first part 12 of the system including a housing 18 that permits mounting of this part in a relatively inaccessible location on a vehicle, e.g. beneath the dashboard of a vehicle on the steering column of the vehicle. The second part 14 of the vehicle security system 10 includes a housing 20 that permits mounting of the part 14 on a readily accessible and visible location on a vehicle, typically on the dashboard of the vehicle in the lower region thereof. The housing 18 can be secured in any suitable manner, whereas it is particularly envisaged that the housing 20 will initially be secured with the aid of double sided adhesive tape, particularly while the vehicle security system 10 serves to protect the associated vehicle while on display in the forecourt of a vehicle dealership. As explained hereafter, if the vehicle security system 10 is to remain on its associated vehicle after sale of the vehicle, the secure location of the housing 20 can be enhanced with the aid of securing screws, or the like.

The first part 12 and the second part 14 include first and second electronic sub-circuits, respectively, which are not shown and which are housed in their respective housings 18 and 20. The two sub-circuits are electrically releasably interconnectable via the communications link 16 to define an integral control circuit which provides an armed and a disarmed state of the security system.

The second electronic sub-circuit of the part 14 includes a central processor (not shown); an RF receiver (not shown), for receiving arm/disarm signals from a compatible transmitter, particularly a conventional RF handheld remote; a power supply (not shown) for the entire control circuit; protection circuitry (not shown) for protecting the control circuit from interference from a vehicle on which it is operatively installed; an intrusion sensor (not shown); a status indicator in the form of a light emitting diode 22, which is externally visible, for indicating an armed status of the system; a relay switch (not shown) for flashing the indicators of a vehicle on which the system is operatively installed; and a reset button 24.

The first electronic sub-circuit of the part 12 includes immobilizer relays, a shock sensor, and a small ancillary microprocessor for receiving coded communications from the central microprocessor of the second electronic sub-circuit of the second part 14.

It is particularly envisaged in the above regard that the components carried by the housing 18 will be the components of the security system in respect of which tampering must be effectively inhibited, whereas the components carried by the housing 20 will be the components in respect of which tampering will not affect the operation of the security system. In particular, tampering with these components will induce activation of the security system.

As is clearly apparent, the electronic communications link 16 has plug-in formations, 26 and 28 respectively, that permit connection of the components of the two parts by plugging into complementary formations provided by the parts, thus facilitating greatly the installation of the vehicle security system, particularly with the part 12 being located in a relatively inaccessible location. It will be understood that the respective formations referred to carry conductive plug-in connectors of the link 16 and the first and second electronic sub-circuits.

With the parts 12 and 14 interconnected via the link 16, the three components define in combination a security system, in accordance with the invention, which provides the functionality of the main part of a conventional vehicle security system. With the system 10 installed on a vehicle, immobilizer relays of the first electronic sub-circuit of the part 14 are connected to an electronic system on a vehicle in a configuration in which they can effect immobilization of the vehicle in response to a predefined trigger event. It is also connected to audio alarm means on the associated vehicle for giving an audible alarm in the case of a predefined trigger event. The system 10 thus will control these security features of the vehicle.

It will also be understood in the above regard that the part 14 of the vehicle security system 10 carries the more expensive components, typically in the order of 60% of the value of components of the system, with the balance of the components carried by the part 12 being generally the less expensive components, but also the components in respect of which tampering should be inhibited.

With the vehicle security system 10 preloaded on a vehicle, if a purchaser of a vehicle decides to purchase the security system also, the secure location of the part 14 on the dashboard of the associated vehicle will merely be enhanced, as described above. If the purchaser of the vehicle does not wish to purchase the security system also, the part 14 can be easily removed, together with the electronic communications link 16, thus effectively recovering the more expensive parts of the security system, for re-use. Such removal is effected whilst the security system 10 is disarmed and the configuration of the first part 12 with respect to the vehicle is such that the operation of the vehicle is automatically restored to its state prior to the installation of the system. The part 12 will remain on the vehicle and will thus effectively be forfeited. Insofar as removal of the part 14 and of the link 16 can be easily carried out, the use of a skilled person is not required, whereas this also will be done time-efficiently so as to ensure that unnecessary costs associated with removal of parts are not incurred. The disadvantages associated with the use of preloaded vehicle security systems as above described are thus at least ameliorated.

It will be understood that the exact configuration of a vehicle security system, in accordance with the invention, is greatly variable, particularly in relation to the design of the housings of the parts associated therewith, and the particular components associated therewith and carried by the respective housings.

The vehicle security system clearly can be associated with various different functions not specifically referred to herein, notably ones associated with vehicle security. The invention extends to all such different configurations vehicle security systems which still incorporate the general principles of the present invention, as above defined and described.

The invention claimed is:

1. A vehicle security system including
    a first part, including a housing and a first electronic sub-circuit housed in the housing, which can be installed in a vehicle in a location which is not readily accessible;
    a second part, including a housing and a second electronic sub-circuit housed in the housing, which can be installed in a vehicle in a readily accessible location;
    a communications link via which the first and the second sub-circuits are, in the operative configuration of the system, releasably interconnected to define an integral control circuit having functionality associated with vehicle security, and
    the system being configured to provide for the operation of a vehicle in which the system is operatively installed to be restored to its pre-installation state by merely removing the second part whilst the system is disarmed, leaving the first part in place.

2. A vehicle security system as claimed in claim 1, which is configured so that tampering with the second part whilst the system is armed will trigger the system to activate associated alarm means.

3. A vehicle security system as claimed in claim 1, in which the first electronic sub-circuit and the communications link define complementary plug-in connectors via which they are operatively releasably interconnected.

4. A vehicle security system as claimed in claim 1, in which the second electronic sub-circuit and the communications link define complementary plug-in connectors via which they are operatively releasably interconnected.

5. A vehicle security system as claimed in claim 1, in which the second electronic sub-circuit includes a central microprocessor for controlling the operation of the control circuit, in the operative configuration of the security system.

6. A vehicle security system as claimed in claim 5, in which the central microprocessor is programmable.

7. A vehicle security system as claimed in claim 5, in which the first electronic sub-circuit includes an ancillary microprocessor, the processors of the first and second electronic sub-circuits providing for coded communication between them.

8. A security system as claimed in claim 1, in which the second electronic sub-circuit includes at least one of
    a receiver, for receiving arm/disarm signals from a compatible transmitter;
    a power supply for the entire control circuit;
    protection circuitry for protecting the control circuit from interference from a vehicle on which it is operatively installed;
    an intrusion sensor;
    a light emitting status indicator light for indicating an armed status of the system;
    a relay switch for flashing the indicators of a vehicle on which the system is operatively installed; and
    a reset button.

9. A vehicle security system as claimed in claim 1, in which the first electronic sub-circuit includes a relay operatively associated with immobilization of a vehicle.

10. A vehicle security system as claimed in claim 1, in which the housing of the first part includes a mounting formation providing for it to be securely mounted on a vehicle.

11. A vehicle security system as claimed in claim 10, in which the first electronic sub-circuit includes a shock sensor.

12. A security system as claimed in claim 1, in which the housing of the second part includes a mounting formation providing for it to be removably mounted inside the passenger compartment of a vehicle.

13. A vehicle security system including
    a first part, including a housing and a first electronic sub-circuit housed in the housing, which can be installed in a vehicle in a location which is not readily accessible;
    a second part, including a housing and a second electronic sub-circuit housed in the housing, which can be installed in a vehicle in a readily accessible location;
    a communications link via which the first and the second sub-circuits are, in the operative configuration of the system, releasably interconnected to define an integral control circuit having functionality associated with vehicle security, and
    the system being configured to provide for the operation of a vehicle in which the system is operatively installed to be restored to its pre-installation state by merely removing both the second part and the communications link whilst the system is disarmed, leaving the first part in place.

14. A vehicle security system as claimed in claim 13, which is configured so that tampering with the second part whilst the system is armed will trigger the system to activate associated alarm means.

15. A vehicle security system as claimed in claim 13, in which the first electronic sub-circuit and the communications link define complementary plug-in connectors via which they are operatively releasably interconnected.

16. A vehicle security system as claimed in claim 13, in which the second electronic sub-circuit and the communications link define complementary plug-in connectors via which they are operatively releasably interconnected.

17. A vehicle security system as claimed in claim 13, in which the second electronic sub-circuit includes a central microprocessor for controlling the operation of the control circuit, in the operative configuration of the security system.

18. A vehicle security system as claimed in claim 17, in which the central microprocessor is programmable.

19. A vehicle security system as claimed in claim 17, in which the first electronic sub-circuit includes an ancillary microprocessor, the processors of the first and second electronic sub-circuits providing for coded communication between them.

20. A security system as claimed in claim 13, in which the second electronic sub-circuit includes at least one of
    a receiver, for receiving arm/disarm signals from a compatible transmitter;
    a power supply for the entire control circuit;
    protection circuitry for protecting the control circuit from interference from a vehicle on which it is operatively installed;

an intrusion sensor;

a light emitting status indicator light for indicating an armed status of the system;

a relay switch for flashing the indicators of a vehicle on which the system is operatively installed; and a reset button.

21. A vehicle security system as claimed in claim 13, in which the first electronic sub-circuit includes a relay operatively associated with immobilization of a vehicle.

22. A vehicle security system as claimed in claim 13, in which the housing of the first part includes a mounting formation providing for it to be securely mounted on a vehicle.

23. A vehicle security system as claimed in claim 22, in which the first electronic sub-circuit includes a shock sensor.

24. A security system as claimed in claim 13, in which the housing of the second part includes a mounting formation providing for it to be removably mounted inside the passenger compartment of a vehicle.

* * * * *